United States Patent
Lake et al.

(10) Patent No.: US 8,354,197 B2
(45) Date of Patent: Jan. 15, 2013

(54) FUEL CELL STACK HAVING AN INTEGRATED END PLATE ASSEMBLY

(75) Inventors: Jeffrey G. Lake, Vernon, CT (US); Leonard A. Bach, West Hartford, CT (US); Pedro Inigo, Hartford, CT (US); Evan C. Rege, Portland, OR (US); Chris Vargas, Hamden, CT (US); Stephen P Victor, Guilford, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 555 days.

(21) Appl. No.: 12/448,400

(22) PCT Filed: Dec. 21, 2006

(86) PCT No.: PCT/US2006/049001
§ 371 (c)(1),
(2), (4) Date: Dec. 22, 2009

(87) PCT Pub. No.: WO2008/088308
PCT Pub. Date: Jul. 24, 2008

(65) Prior Publication Data
US 2010/0167156 A1    Jul. 1, 2010

(51) Int. Cl.
*H01M 2/20* (2006.01)
*H01M 2/14* (2006.01)
(52) U.S. Cl. ......... 429/470; 429/467; 429/511; 429/508
(58) Field of Classification Search ................ 429/467, 429/470, 507, 508, 511
See application file for complete search history.

(56) References Cited

U.S. PATENT DOCUMENTS

| | | | | |
|---|---|---|---|---|
| 4,642,274 A | * | 2/1987 | Tsutsumi et al. | 429/434 |
| 4,997,728 A | * | 3/1991 | Onoda et al. | 429/470 |
| 5,009,968 A | * | 4/1991 | Guthrie et al. | 429/434 |
| 6,124,051 A | * | 9/2000 | Johnson | 429/434 |
| 6,764,786 B2 | | 7/2004 | Morrow et al. | |
| 6,824,901 B2 | | 11/2004 | Reiser et al. | |

FOREIGN PATENT DOCUMENTS
JP     61116770 A  *  6/1986
JP   2005149849 A  *  6/2005

OTHER PUBLICATIONS
JPO Machine Translation of JP 2005-149849 A.*

* cited by examiner

*Primary Examiner* — Maria J Laios
*Assistant Examiner* — Robert S Carrico
(74) *Attorney, Agent, or Firm* — Malcolm J. Chisholm, Jr.

(57) ABSTRACT

A fuel cell stack (30) includes an integrated end plate assembly having a current collector (40) secured adjacent and end cell (36) of the stack, a pressure plate (42) secured adjacent the current collector (40), and a backbone (60) secured within a backbone-support plane (44) defined within the plate (42). Tie rod ends (62, 64, 66, 68) of the backbone (60) extend over a gap (84) defined between the backbone-support plane (44) and a deflection plane (50) defined within the pressure plate (42) so that the tie rod ends deflect within the gap (84) upon tightening of tie rods (78, 80). Deflection of the backbone enables the backbone (60) to permit limited expansion of the fuel cell stack (30) during operation, and the backbone (60) has adequate flexural strength to prohibit expansion of the stack (30) beyond operating dynamic limits of the stack (30).

9 Claims, 4 Drawing Sheets

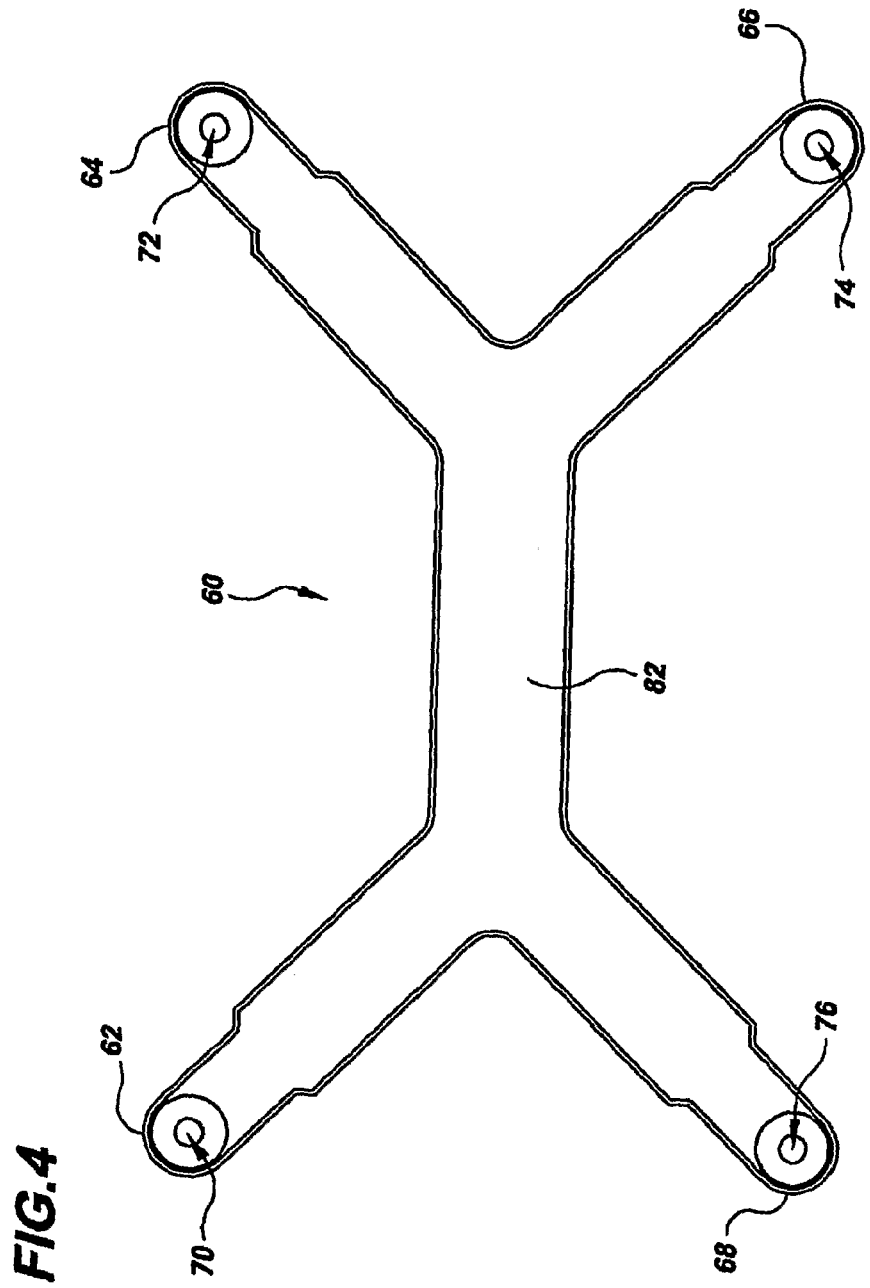

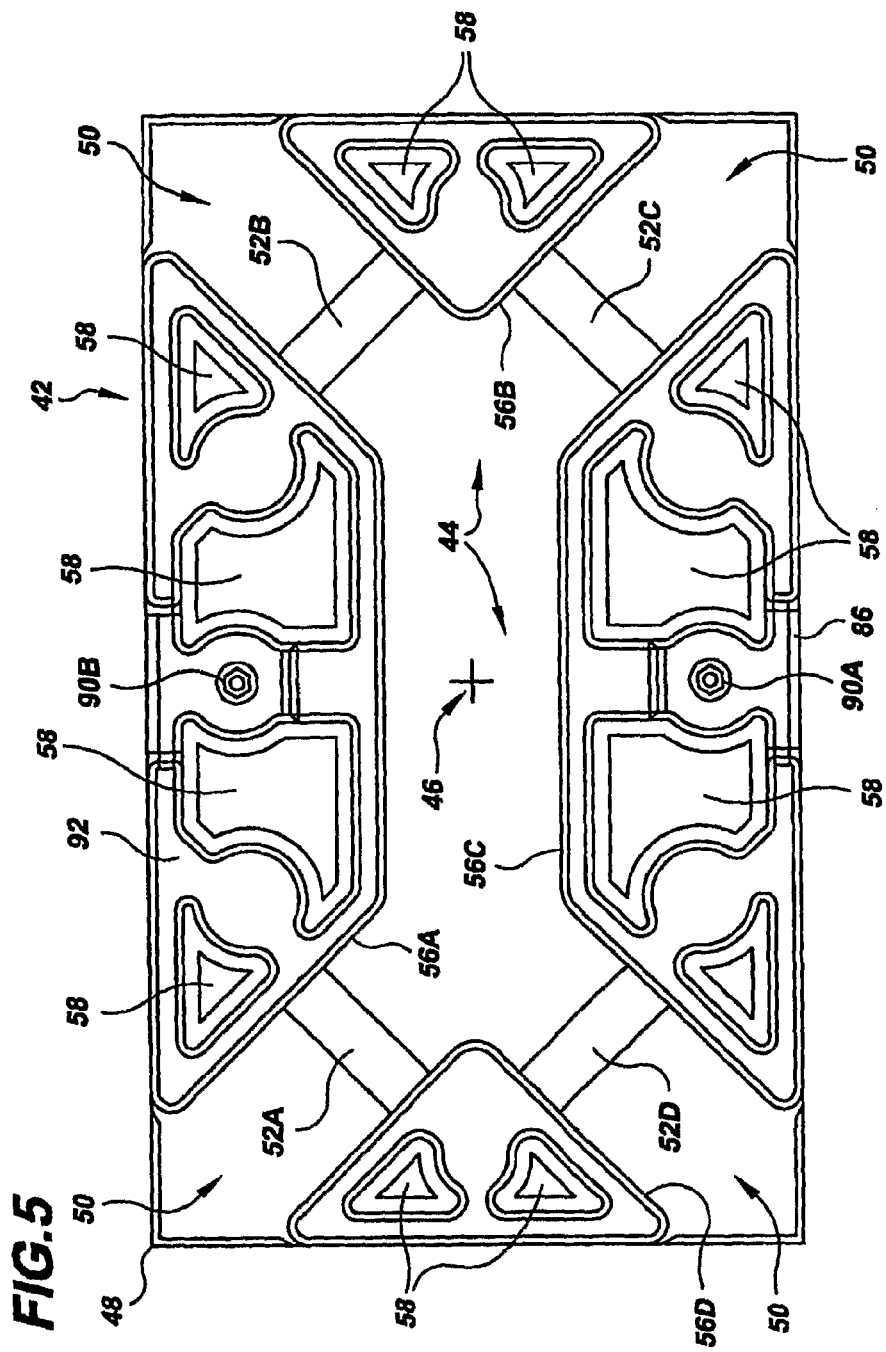

FUEL CELL STACK HAVING AN INTEGRATED END PLATE ASSEMBLY

TECHNICAL FIELD

The present disclosure relates to fuel cells that are suited for usage in transportation vehicles, portable power plants, or as stationary power plants, and the disclosure especially relates to a fuel cell stack having an integrated end plate assembly that has a low thermal capacity through use of a combination of a current collector, a light pressure plate and a rigid backbone overlying the pressure plate.

BACKGROUND ART

Fuel cells are well-known and are commonly used to produce electrical energy from reducing and oxidizing reactant fluids to power electrical apparatus, such as apparatus on-board space vehicles, transportation vehicles, or as on-site generators for buildings. A plurality of planar fuel cells are typically arranged into a cell stack surrounded by an electrically insulating frame structure that defines manifolds for directing flow of reducing, oxidant, coolant and product fluids as part of a fuel cell power plant. Each individual fuel cell generally includes an anode electrode and a cathode electrode separated by an electrolyte. A fuel cell may also include a water transport plate, or a separator plate, as is well known.

The fuel cell stack produces electricity from reducing fluid and process oxidant streams. As shown in the simplified schematic drawing of a prior art fuel cell stack in FIG. 1, the prior art fuel cell stack 10 includes a reaction portion 12 formed from a plurality of fuel cells 14 stacked adjacent each other that produce electricity in a well-known manner. The plurality of fuel cells 14 includes a first end cell 16 and opposed second end cell 18 at opposed ends of the reaction portion 12 of the fuel cell stack 10. First and second pressure plates 20, 22 overlie the end cells 16, 18 and the pressure plates 20, 22 are secured to each other typically by a plurality of tie rods (not shown) to apply a compressive load to the stack to seal a plurality of compression seals within the stack 10. Most known pressure plates 20, 22 are made of large, conductive metal materials.

During operation of such fuel cell stacks 10, creation of heat by the stack 10, and flow of compressed fluids through the stack 10 results in expansion and contraction of dimensions of the stack 10 within operating dynamic limits of the fuel cell stack 10. Therefore, to permit expansion of the stack 10 within such limits, known fuel cell stacks 10 utilize a load follow-up system. A common load follow-up system includes one or more belleville washers (not shown) secured to each tie rod of the stack 10, between a tie rod securing nut (not shown) and the pressure plates 20, 22. Such a load follow-up system provides for limited expansion within the operating dynamic limits of the stack 10 while applying a constant minimum load to the stack 10. Traditionally, to achieve an effective load follow-up system, known fuel cell stacks 10 have utilized large, heavy, metallic pressure plates 20, 22 as part of the load follow-up system.

Such known fuel cell stacks 10 have given rise to many problems related to a high thermal capacity of the large pressure plates 20, 22. For example, during a "bootstrap" start up from subfreezing conditions, preferably no auxiliary heated fluids are applied to the fuel cell stack 10, while a reducing fluid, such as hydrogen, and an oxidant, such as oxygen or air, are supplied to the fuel cells 14. In a fuel cell 14 utilizing a proton exchange membrane ("PEM") as the electrolyte, the hydrogen electrochemically reacts at a catalyst surface of an anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy. Electricity produced by the fuel cells 14 flows into and/or through the conductive pressure plates 20, 22.

During such a "bootstrap" start up, the fuel cells 14 that are in a central region of the stack 10 quickly rise in temperature compared to the end cells 16, 18 that are adjacent opposed ends of the stack 10. The end cells 16, 18 heat up more slowly because heat generated by the end cells 16, 18 is rapidly conducted into the large, conductive metallic pressure plates 20, 22. If a temperature of the end cells 16, 18 is not quickly raised to greater than 0 degrees Celsius ("° C."), water in water transport plates within the stack 10 will remain frozen thereby preventing removal of product water, which results in the end cells 16, 18 being flooded with fuel cell product water. The flooding of the end cells 16, 18 retards reactant fluids from reaching catalysts of the end cells 16, 18 and may result in a negative voltage in the end cells 16, 18. The negative voltage in the end cells 16, 18 may result in hydrogen gas evolution at cathode electrodes and/or corrosion of carbon support layers of electrodes of the cells 16, 18. Such occurrences would degrade the performance and long-term stability of the fuel cell stack 10.

Many efforts have been undertaken to resolve such problems. For example, U.S. Pat. No. 6,764,786 that issued on Jul. 20, 2004, to Morrow et al. discloses a pressure plate that is made of an electrically non-conductive, non-metallic, fiber reinforced composite material, so that the pressure plate is light, compact and has a low thermal capacity. Similarly U.S. Pat. No. 6,824,901 that issued on Nov. 30, 2004, to Reiser et al. discloses a fuel cell stack having thermal insulting spacers between pressure plates and end cells. Both of these patents are owned by the assignee of all rights in the present disclosure. While known fuel cell stacks have limited such problems related to the high thermal capacity of large, metallic pressure plates, such fuel cell stacks still present substantial challenges for efficient operation, especially for PEM electrolyte based fuel cells within fuel cell stacks that undergo frequent start-stop cycles in varying ambient conditions, such as in powering transportation vehicles.

Accordingly, there is a need for a fuel cell stack having end cells wherein temperatures of the end cells can be raised to greater than 0° C. as quickly as possible during start up from subfreezing conditions, and that can also provide an efficient load follow-up system.

SUMMARY

The disclosure is a fuel cell stack for producing electricity from reducing fluid and process oxidant reactant streams. The stack includes a plurality of fuel cells stacked adjacent each other to form a reaction portion of the fuel cell stack. An end cell is secured at an outer end of the reaction portion of the fuel cell stack. The stack also includes an integrated end plate assembly secured adjacent the end cell. The assembly includes a current collector secured adjacent and in electrical communication with the end cell, and a pressure plate secured adjacent the current collector and overlying the end cell. The pressure plate is made of an electrically non-conductive, non-metallic composite material. The pressure plate defines a backbone-support plane that extends a distance from a center of the pressure plate to between about thirty percent and about eighty percent of a distance between the center of the pressure plate and an exterior perimeter of the pressure plate. (For purposes herein, the word "about" is to mean plus or minus twenty percent.) The pressure plate also defines a deflection plane extending between the backbone-support plane and the exterior perimeter of the pressure plate. The deflection plane is also defined between the backbone-support plane and a contact surface of the pressure plate adjacent the current collector.

The integrated end plate assembly also includes a backbone having a plurality of tie-rod ends defining throughbores configured to receive and secure tie rods adjacent a perimeter of the fuel cell stack. The backbone includes at least one beam that extends between the tie-rod ends. The backbone is secured adjacent the backbone-support plane of the pressure plate, and the beam contacts and extends along the backbone-support plane so that the pressure plate is secured between the backbone and the current collector. The tie-rod ends of the backbone overlie the deflection plane of the pressure plate to thereby define a gap between the tie-rod ends and the deflection plane. The backbone has adequate flexibility to permit expansion of the fuel cell stack within operating dynamic limits of the stack and the backbone also has adequate flexural strength to prohibit expansion of the fuel cell stack beyond the operating dynamic limits of the stack. The deflection plane is defined within the pressure plate an adequate distance from the backbone-support plane to permit flexure of the backbone within the gap defined between the tie rod ends of the backbone and the deflection plane.

By integrating the backbone with the multi-plane pressure plate, the present fuel cell stack achieves an efficient follow-up load system without the heavy, high thermal mass of known fuel cell stacks. Through deflection of the tie rod ends of the backbone within the gap adjacent the deflection plane of the pressure plate, the backbone acts as a cantilevered beam to extend between opposed perimeters of the pressure plate to both redistribute a clamping load from the tie rod ends through the center of the pressure plate, and to also provide sufficient deflection to provide a load follow-up system for the cell stack.

Upon assembly of the fuel cell stack, as the tie rod nuts tighten the tie rods to apply a compressive load to the stack, the tie rod ends bend or deflect into the gap, but do not contact the deflection plane of the pressure plate. During operation of the fuel cell stack the tie rod ends will deflect slightly at different operating temperatures and conditions of the stack to permit expansion of the stack within the operating dynamic limits of the stack. The backbone is configured with adequate flexural strength to prohibit expansion of the stack beyond those limits. Deflection of the backbone will also gradually decrease over time because fuel cell components become slightly thinner due to compressive creep. This follow-up load system provided by the cantilever beam-like deflection of the backbone results in significantly less change in an overall load of the fuel cell stack for a specific change in stack thickness compared to changes in a load of a fuel cell stack having known large metal pressure plates for a similar change in stack thickness. In a preferred embodiment, the backbone is made of stainless steel.

Accordingly, it is a general purpose of the present disclosure to provide a fuel cell stack having an integrated end plate assembly that overcomes deficiencies of the prior art.

It is a more specific purpose to provide a fuel cell stack having a low thermal mass integrated end plate assembly that distributes a clamping load from a perimeter of the fuel cell stack through a center of the stack, and that provides an efficient follow-up load system to afford limited expansion of the stack.

These and other purposes and advantages of the present a fuel cell stack having an integrated end plate assembly will become more readily apparent when the following description is read in conjunction with the accompanying drawing.

BRIEF DESCRIPTION OF DRAWING

FIG. 4 is a top plan view of the backbone of FIG. 3.

FIG. 5 is a top plan view of the pressure plate of FIG. 3 showing a backbone-support plane and a deflection plane defined within the plate.

DESCRIPTION OF THE PREFERRED EMBODIMENTS

Figure 1:
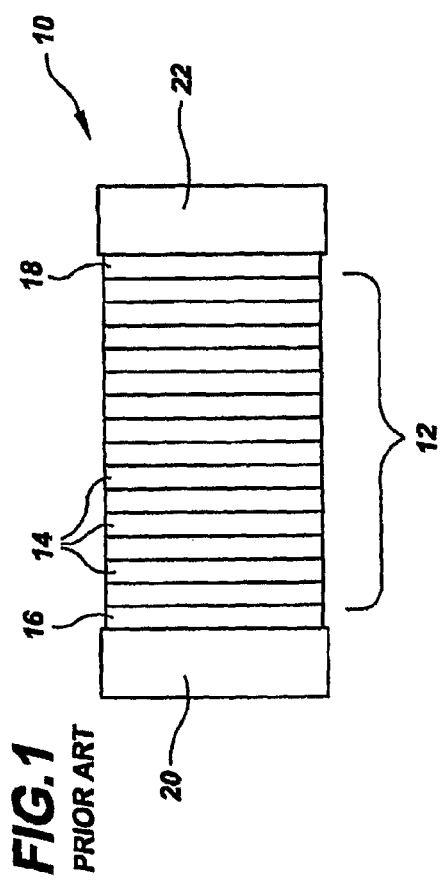
FIG. 1 is a simplified schematic representation of a prior art fuel cell stack.
Figure 2:
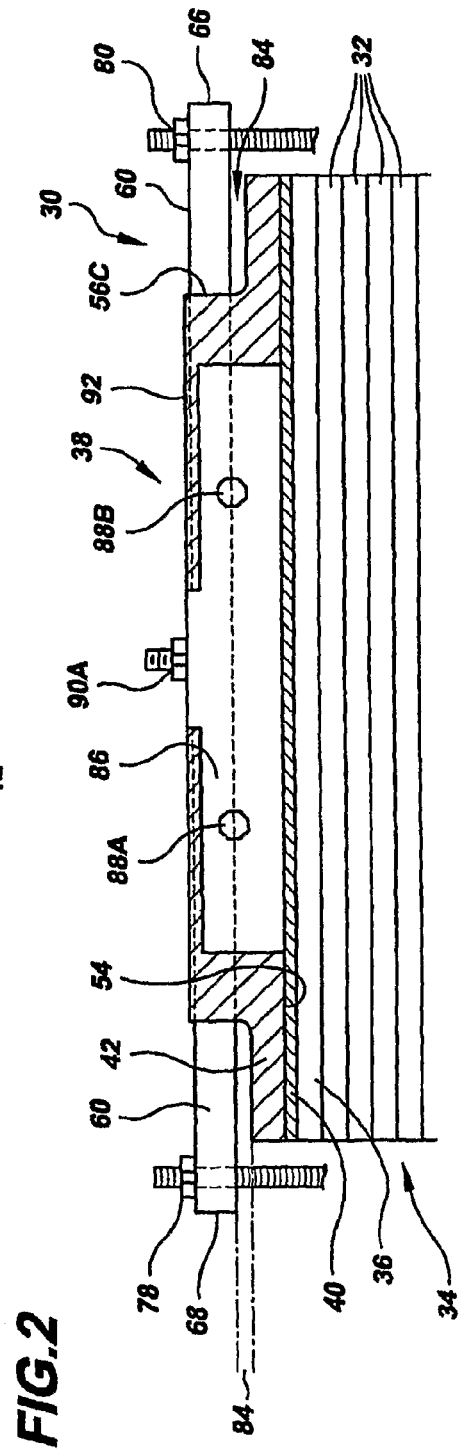
FIG. 2 is a sectional, schematic side view of a fuel cell stack having an integrated end plate assembly constructed in accordance with the present disclosure.

Referring to the drawings in detail, a sectional view of a fuel cell stack having an integrated end plate assembly is shown in FIG. 2, and is generally designated by the reference numeral 30. The fuel cell stack 30 includes a plurality of fuel cells 32 stacked adjacent each other to form a reaction portion 34 of the fuel cell stack 30 for producing electricity from reducing fluid and process oxidant reactant streams. An end cell 36 is secured at an outer end of the reaction portion 34 of the fuel cell stack 30. The fuel cell stack 30 also includes an integrated end plate assembly 38 secured adjacent the end cell 36.

The integrated end plate assembly 38 includes an electrically conductive current collector 40 secured adjacent to and in electrical communication with the end cell 36 to direct flow of the electrical current from the fuel cells 32, 36 out of the stack 30. A pressure plate 42 is secured adjacent the current collector 40 at a surface of the current collector 40 opposed to the surface of the current collector 40 contacting the end cell 36. The pressure plate may also overlie the end cell 36. The pressure plate 42 has adequate stiffness to apply an even compressive load to the fuel cells 32, 36 of the stack 30, and may be made of an electrically non-conductive, non-metallic composite material.

The pressure plate 42 defines a backbone-support plane 44 shown in FIG. 5. The backbone-support plane 44 extends a distance from a center 46 of the pressure plate 42 to between about thirty percent and about eighty percent, or preferably between about fifty percent and about sixty percent of a distance between the center 46 of the pressure plate 42 and an exterior perimeter 48 of the pressure plate 42. An optimal distance of the extension of the backbone-support plane 44 is about fifty-five percent. This distance is established to minimize undesirable distortion of the pressure plate 42 while optimizing deflection of a backbone 60 supported adjacent the backbone-support plane 44, as described in more detail below. The pressure plate 42 also defines a deflection plane 50 extending between the backbone-support plane 44 and the exterior perimeter 48 of the pressure plate 42. A plurality of ramps 52A, 52B, 52C, 52D, or edges may also be defined within the pressure plate 42 between the backbone-support plane 44 and the deflection plane 50. As shown in FIG. 5, the deflection plane 50 may be defined at a plurality of locations at the exterior perimeter 48 of the pressure plate 42, such as at the four corners of the rectangular-shaped pressure plate 42 shown in FIG. 5. The deflection plane 50 is also defined between the backbone-support plane 44 and a contact surface 54 of the pressure plate 42 that is adjacent to the current collector 40. By use of the phrases "backbone-support plane 44" and "deflection plane 50" it is meant that the two components are on differing planes, and hence are not co-planar. However, the phrases do not mean that that the "backbone-support plane 44" or "deflection plane 50" are necessarily planar throughout their respective surface areas, or are necessarily in a plane parallel to each other or to any other component of the fuel cell stack 30. In a preferred embodiment, the backbone-support plane 44 and deflection plane 50 may be planar throughout their surface areas, and may also be in parallel planes, but that is not a requirement of the disclosure. The pressure plate 42 may also define a plurality of walls 56A, 56B, 56C, 56D, adjacent to the backbone-support plane 44 and/or the deflection plane 50 and arising in a direction away from the current collector 42. The pressure plate 42 may also define a plurality of cut-outs to minimize material requirements in fabrication of the plate 42.

Figure 3:
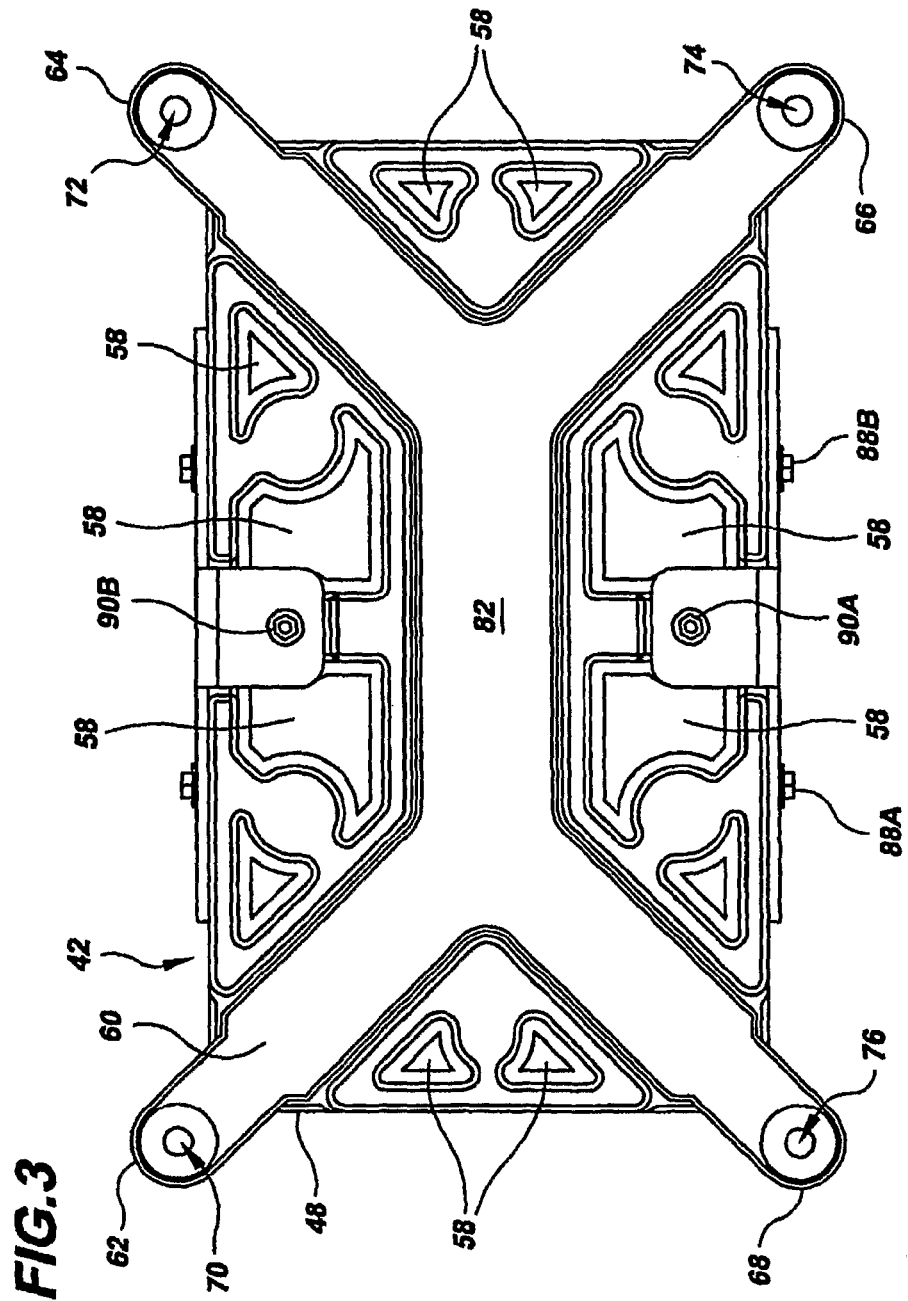
FIG. 3 is a top plan view of the FIG. 2 fuel cell stack showing a backbone secured within a pressure plate.

The integrated plate assembly 30 also includes the backbone 60 as shown in FIGS. 2, 3, and 4. The backbone 60 includes a plurality of tie-rod ends 62, 64, 66, 68, and each tie-rod end 62 defines a throughbore 70, 72, 74, 76 configured to receive and secure tie-rods 78, 80 adjacent the perimeter of a cell stack 30, as shown in FIGS. 2 and 3. While FIG. 2 shows only one end of the fuel cell stack 30, it is to be understood that the present disclosure may include identical or similar structures described herein at an opposed end (not shown) of the fuel cell stack 30. The backbone 60 also includes at least one beam 82 extending between the tie-rod ends 62, 64, 66, 68. As best shown in FIGS. 2 and 3, the backbone 60 is secured adjacent the backbone-support plane 44 of the pressure plate 42, and the beam 82 is configured to contact and extend along the backbone-support plane 44 to secure the pressure plate 42 between the backbone 60 and the current collector 40. In a preferred embodiment, the beam 82 passes over the center 46 of the pressure plate 42 to facilitate distribution of the tie rod 78, 80 clamping forces throughout the pressure plate 42.

The tie-rod ends 62, 64, 66, 68, of the backbone 60 are configured to overlie the deflection plane 50 of the pressure plate 42, thereby defining a gap 84 between the tie-rod ends and deflection plane 50, as shown in FIG. 2. The backbone 60 is configured to have adequate flexibility to permit expansion of the fuel cell stack within operating dynamic limits of the stack 30 and the backbone 60 has adequate flexural strength to prohibit the fuel cell stack 30 from expanding beyond the operating dynamic limits of the stack 30. The deflection plane 50 is defined within the pressure plate 42 an adequate distance from the backbone-support plane 44 to permit the described deflection of the backbone 60 within the gap 84.

The fuel cell stack 30 may also include a current collector lead 86 that is secured by fasteners 88A, 88B to the pressure plate 42 and that is secured in electrical communication with the current collector 40 to direct electrical current from the collector 40 to current terminals 90A, 90B that may be secured at an outer surface 92 of the pressure plate 42. As best seen in FIGS. 3 and 5 the walls 56A, 56B, 56C, 56D, that are defined within the pressure plate 42 and adjacent the backbone-support plane 44 and/or the deflection plane 50 are also configured to be adjacent the backbone 60 on the backbone-support plane 44. The walls 56A, 56B, 56C, 56D thereby prohibit lateral motion of the backbone 60 in any direction about parallel to a plane defined by the contact surface 54 of the pressure plate 42.

By integrating the backbone 60 with the pressure plate 42 that has both the backbone-support plane 44 and the deflection plane 50, the fuel cell stack performs as an efficient follow-up load system, without a heavy, high thermal mass pressure plate 20, 22 of a prior art fuel cell stack 10. The backbone 60 may be made of any material that is sufficiently strong to achieve the described functions. A preferred material for the backbone 60 is stainless steel, and a preferred stainless steel is 316L stainless steel. A preferred current collector 40 is constructed of gold plated tin, or gold plated 316L stainless steel. By decreasing an overall mass of the backbone 60 through high-strength materials, the detrimental loss of heat described above by fuel cells 32 adjacent the end cell 36 can be eliminated or minimized, while also providing the described follow-up load system. In a preferred embodiment, a maximum planar cross-sectional area of the backbone 60 in a plane parallel to the contact surface 54 of the pressure plate 42 is no greater than about fifty percent of a planar cross sectional area of the pressure plate 42 in a plane parallel to the contact surface 54 of the pressure plate 42.

In use of the fuel cell stack 30 having the integrated end plate assembly 30, as the tie rods 78, 80 are tightened upon the backbone 60 tie rod ends 62, 64, 66, 68, the tie rods 78, 80 apply a compressive load to the stack 30. The tie rod ends 62, 64, 66, 68 bend or deflect into the gap 84, but do not contact the deflection plane 50 of the pressure plate 42. During operation of the fuel cell stack 30 the tie rod ends 62, 64, 66, 68 will deflect slightly at different operating temperatures and conditions of the stack 30 to permit expansion of the stack 30 within the operating dynamic limits of the stack 30. Deflection of the backbone 60 will also gradually decrease over time because fuel cell stack 30 components become slightly thinner due to compressive creep. The follow-up load system provided by the cantilever beam-like deflection of the backbone 60 within the gap 84 results in significantly less change in an overall load of the fuel cell stack 30 for a specific change in stack 30 thickness compared to changes in a load of a prior art fuel cell stack 10 having known large metal pressure plates 20, 22 for a similar change in thickness of the prior art stack 10.

The present disclosure also includes a method of dynamically securing fuel cells 32, 36 within a fuel cell stack 30, including the steps of defining a backbone-support plane 44 within a pressure plate 42 so that the backbone-bone support plane 44 extends a distance from a center 46 of the pressure plate 42 that is between about thirty percent and about eighty percent of a distance between the center of the plate 42 and an exterior perimeter 48 of the plate 42; defining a deflection plane 50 within the pressure plate 42 extending between the backbone-support plane 44 and the exterior perimeter 48 of the pressure plate and between the backbone-support plane 44 and the contact surface 54 of the pressure plate 42; securing the pressure plate 42 adjacent a current collector 40; securing the current collector 40 adjacent the end cell 36 of the stack 30; securing the backbone 60 within the backbone-support plane 44 so that tie rod ends 62, 64, 66, 68 of the backbone 60 extend over the deflection plane 50 defined within the pressure plate 42; and deflecting the tie rod ends 62, 64, 66, 68 within the gap 84 defined between the tie rod ends 62, 64, 66, 68 and the deflection plane 50 by tightening tie rods 78, 80 within the tie rod ends 62, 64, 66, 68 of the backbone 60. By tightening the tie rods 78, 80 to deflect the tie rod ends 62, 64, 66, 68 into the gap 84, the method of dynamically securing the fuel cells 32, 36 within the fuel cell stack 30 provides for both redistribution of the compressive load of the tie rods 78, 80 adjacent the exterior perimeter 48 through the pressure plate 42 to the center 46 of the plate 42, and also provides the described follow-up load system.

While the present disclosure has been disclosed with respect to the described and illustrated fuel cell stack 30 having an integrated end plate assembly 38, it is to be understood the disclosure is not to be limited to those alternatives and described embodiments. For example, the disclosure may be utilized with any fuel cells including phosphoric acid fuel cells, proton exchange membrane fuel cells, etc. Accordingly, reference should be made primarily to the following claims rather than the forgoing description to determine the scope of the disclosure.

What is claimed is:

1. A fuel cell stack (30) for producing electricity from reducing fluid and process oxidant reactant streams, the fuel cell stack (30) comprising:
   a. a plurality of fuel cells (32) stacked adjacent each other to form a reaction portion (34) of the fuel cell stack (30), the plurality of fuel cells (32) including an end cell (36) at an outer end of the reaction portion (34) of the fuel cell stack (30);
   b. an integrated end plate assembly (38) secured adjacent the end cell (36), the assembly including;
      i. a current collector (40) secured adjacent and in electrical communication with the end cell (36);
      ii. a pressure plate (42) secured adjacent the current collector and overlying the end cell (36), the pressure plate (42) defining a backbone-support plane (44) extending a distance from a center (46) of the pressure plate to between about thirty percent and about eighty percent of a distance between the center (46) of the pressure plate (42) and an exterior perimeter (48) of the pressure plate (42), and the pressure plate (42) defining a deflection plane (50) extending between the backbone-support plane (44) and the exterior perimeter (48) of the pressure plate (42), the deflection plane (50) also being between the backbone-support plane (44) and a contact surface (54) of the pressure plate (42) adjacent the current collector (40);
      iii. a backbone (60) including a plurality of tie-rod ends (62, 64, 66, 68) defining throughbores (70, 72, 74, 76) configured to receive and secure tie rods (78, 80) adjacent a perimeter (48) of the pressure plate (42), the backbone (60) including at least one beam (82) extending between the tie-rod ends (62, 64, 66, 68), the backbone (60) being secured adjacent the backbone-support plane (44) defined by the pressure plate (42), the backbone (60) also being secured adjacent a plurality of walls (56A, 56B, 56C, 56D) defined by the pressure plate (42), the plurality of walls (56A, 56B, 56C, 56D) extending adjacent at least two opposed sides of the beam (82) of the backbone (60) in a direction away from the current collector (40) a distance that is at least the same as a distance that the backbone (60) extends above the backbone-support plane (44) in a direction away from the current collector (40), and the backbone also configured to contact and extend along the backbone-support plane (44), and the tie-rod ends (62, 64, 66, 68) of the backbone (60) configured to overlie the deflection plane (50) and define a gap (84) between the tie-rod ends (62, 64, 66, 68) and the deflection plane (50), the backbone (60) configured to have adequate flexibility to permit expansion of the fuel cell stack (30) within operating dynamic limits of the stack (30) and having predetermined flexural strength to prohibit expansion of the stack (30) beyond the operating dynamic limits of the stack (30); and,
      iv. the deflection plane (50) being defined within the pressure plate (42) a predetermined distance from the backbone-support plane (44) to permit flexure of the backbone (60) within the gap (84).

2. The fuel cell stack (30) of claim 1, wherein the backbone-support plane extends a distance from the center (46) of the pressure plate to between about fifty percent and about sixty percent of a distance between the center (46) of the pressure plate (42) and an exterior perimeter (48) of the pressure plate (42).

3. The fuel cell stack (30) of claim 1, wherein the beam (82) of the backbone (60) extends across the center (46) of the pressure plate (42).

4. The fuel cell stack (30) of claim 1, wherein a maximum planar cross sectional area of the backbone (60) in a plane parallel to the contact surface (54) of the presure plate (42) is no greater than about fifty percent of a planer cross sectional area of the pressure plate (42) in a plane parallel to the contact surface (54) of the pressure plate (42).

5. A method of dynamically securing fuel cells (32, 36) within the fuel cell stack (30) of claim 1, comprising the steps of:
   a. defining the backbone-support plane (44) within the pressure plate (42), the backbone-support plane (44) configured to extend a distance from the center (46) of the pressure plate (42) to between about thirty percent and about eighty percent of a distance between the center (46) of the plate (42) and an exterior perimeter (48) of the plate (42), and defining the deflection plane (50) within the pressure plate (42) extending between the backbone-support plane (44) and the exterior perimeter (48) of the pressure plate (42) and between the backbone-support plane (44) and the contact surface (54) of the pressure plate (42);
   b. securing the contact surface (54) of the pressure plate (42) adjacent the current collector (40);
   c. securing the current collector (40) adjacent the end cell (36) of the stack (30);
   d. securing the backbone (60) within the backbone-support plane (44) so that tie rod ends (62, 64, 66, 68) of the backbone (60) extend over the deflection plane (50) defined within the pressure plate (42), and so that the plurality of walls (56A, 56B, 56C, 56D) are adjacent at least opposed sides of the beam (82) of the backbone (60) to prohibit lateral motion of the backbone (60) in any direction about parallel to a plane defined by the contact surface (54) of the pressure plate (42); and,
   e. deflecting the tie rod ends (62, 64, 66, 68) within the gap (84) defined between the tie rod ends (62, 64, 66, 68) and the deflection plane (50) by tightening tie rods (78, 80) within the tie rod ends (62, 64, 66, 68) of the backbone (60).

6. A method of dynamically securing fuel cells (32) within the fuel cell stack (30) of claim 1, comprising the steps of:
   a. integrating the backbone (60) within the walls (56A, 56B, 56C, 56D) of the multi-plane pressure plate (42) coupled to the current collector (40) secured adjacent the end cell (36) of the fuel cell stack (30) to form a low thermal mass integrated end plate assembly (38) that prohibits lateral motion of the backbone (60) in any direction;
   b. deflecting tie rod ends (62, 64, 66, 68) of the backbone (60) within the gap (84) adjacent the deflection plane (50) of the multi-plane pressure plate (42);
   c. extending the beam (82) of the backbone (60) between opposed exterior perimeters (48) of the multi-plane pressure plate (42);

d. redistributing a clamping load from the tie-rod ends (62, 64, 66, 68) of the backbone (60) through the center (46) of the multi-plane pressure plate (42); and, e. providing a load follow-up load wherein the tie-red ends (62, 64, 66, 68) deflect within the gap (84) to a predetermined value in an absence of contacting the deflection plane (50).

7. The method of claim 6, further comprising deflecting the tie rod ends (62, 64, 66, 68) into the gap (84) responsive to varying fuel cell temperatures, and permitting expansion of the fuel cell stack (30) within operating dynamic limits of the fuel cell stack (30).

8. The method of claim 6, comprising the further step of configuring the backbone (60) with a predetermined flexural strength to prohibit expansion of the fuel cell stack (30) beyond operating dynamic limits of the fuel cell stack (30).

9. The method of claim 6, comprising the further steps of gradually decreasing deflection of the tie rod ends (62, 64, 66, 68) of the backbone (60) responsive to thinning of the fuel cells (32) resulting from compressive creep, and maintaining the follow-up load responsive to the decreasing deflection of the tie rod ends (62, 64, 66, 68).

* * * * *